United States Patent [19]

Chubb

[11] Patent Number: 4,684,497
[45] Date of Patent: Aug. 4, 1987

[54] CADMIUM OXIDE GLAZED NUCLEAR FUEL PELLET AND GLAZING COMPOSITION

[75] Inventor: Walston Chubb, Franklin Township, Pa.

[73] Assignee: Westinghouse Electric Corp., Pittsburgh, Pa.

[21] Appl. No.: 883,030

[22] Filed: Jul. 7, 1986

Related U.S. Application Data

[63] Continuation of Ser. No. 572,711, Jan. 20, 1984, abandoned.

[51] Int. Cl.$^4$ .............................................. G21C 3/00
[52] U.S. Cl. ................................... 376/419; 376/414; 376/416; 376/417; 376/339; 252/478
[58] Field of Search ............... 376/419, 414, 416, 417, 376/339; 252/478, 457

[56] References Cited

U.S. PATENT DOCUMENTS

| | | |
|---|---|---|
| 3,122,484 | 2/1964 | Iskenderian . |
| 3,141,852 | 7/1964 | Dressler et al. . |
| 3,427,222 | 2/1969 | Biancheria ........................... 376/419 |
| 4,297,168 | 10/1981 | Grubb ................................ 376/418 |

FOREIGN PATENT DOCUMENTS

| | | |
|---|---|---|
| 2007993 | 2/1970 | France . |
| 2148548 | 3/1973 | France . |
| 2025929 | 7/1979 | United Kingdom . |

OTHER PUBLICATIONS

Abstract: Neutronenabsorbierende Glaskermiken (With English Translation). #2256, cited in Patent Case, cited by Applicant.

Primary Examiner—Donald P. Walsh

[57] ABSTRACT

A cadmium oxide glazed nuclear fuel pellet and glazing composition therefor is disclosed which controls the reactivity and extends the operating life cycle of a nuclear reactor while increasing the rate of burnout of the burnable absorber and reducing the amount of undersirable gases produced therefrom. The glaze forming composition comprises at least about 0.5 percent by weight cadmium oxide as a burnable absorber, i.e., cadmium-113 isotope, and at least one glaze forming oxide. The glaze constituents are formed into a slurry and a nuclear fuel pellet is dipped into the slurry to produce a hard refractory glaze upon firing and cooling.

27 Claims, 1 Drawing Figure

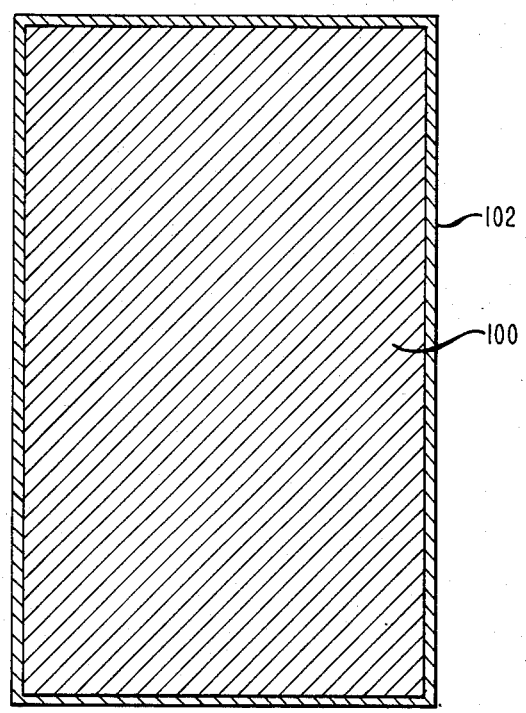

CADMIUM OXIDE GLAZED NUCLEAR FUEL PELLET AND GLAZING COMPOSITION

This application is a continuation, of application Ser. No. 06/572,711 filed Jan. 20, 1984, now abandoned.

BACKGROUND OF THE INVENTION

The present invention relates in general to glazed nuclear fuel pellets and glazing compositions therefor, and more particularly, to the use of cadmium-113 isotope in the form of cadmium oxide (CdO) as a burnable absorber, also referred to as a burnable poison, in a glazing composition including other glass forming oxides for glazing nuclear fuel pellets for controlling the nuclear reactivity of a reactor core and ultimately extending the operating life cycle of the nuclear reactor.

The process of nuclear fission involves the disintegration of fissionable nuclear fuel material into two or more fission products of lower mass number. Among other things, the process also includes a net increase in the number of available free neutrons which are the basis for a self-sustaining reaction. When a reactor has operated over a period of time, the fuel assembly with fissionable materials must ultimately be replaced due to depletion. Inasmuch as the process of replacement is time consuming, taking as much as six weeks, and costly in terms of lost power generation, it is desirable to extend the life of a given fuel assembly as long as practically feasible. For that reason, deliberate additions to the reactor fuel of parasitic neutron-capturing elements in calculated small amounts may lead to highly beneficial effects on a thermal reactor. Such neutron-capturing elements are usually designated as burnable absorbers if they have a high probability or cross section for absorbing neutrons while producing no new or additional neutrons or changing into new absorbers as a result of neutron absorption. During reactor operation, the burnable absorbers are progressively reduced in amount so that there is a compensation made with respect to the concomitant reduction in the fissionable material.

The life of a fuel assembly may be extended by combining an initially larger amount of fissionable material, as well as a calculated amount of burnable absorber. During the early stages of operation of such a fuel assembly, excessive neutrons are absorbed by the burnable absorber which undergoes transformation to elements of low neutron cross section which do not substantially affect the reactivity of the fuel assembly in the latter period of its life when the availability of fissionable material is lower. The burnable absorber compensates for the larger amount of fissionable material during the early life of the fuel assembly, but progressively less absorber captures neutrons during the latter life of the fuel assembly, so that a long life at relatively constant fission level is assured for the fuel assembly. Accordingly, with a fuel assembly containing both fissionable material and burnable absorber in carefully proportioned quantities, an extended fuel assembly life can be achieved with relatively constant neutron production and reactivity. Burnable absorbers which may be used include boron, gadolinium, cadmium, samarium, europium, and the like, which upon the absorption of neutrons result in isotopes of sufficiently low neutron capture cross section so as to be substantially transparent to neutrons.

The incorporation of burnable absorbers in fuel assemblies has thus been recognized in the nuclear field as an effective means of increasing fissionable material capacity and therby extending reactor core life, for example, to eighteen months without the requirement for fissionable material replacement. Burnable absorbers are used either uniformly mixed with the fissionable material, i.e., distributed absorber, deposited as a coating on the exterior of nuclear fuel pellets containing fissionable material as disclosed in U.S. Pat. No. 3,427,222, or are placed discretely as separate elements in the reactor core. Thus, the net reactivity of the reactor core can be maintained relatively constant over the active life of a reactor core.

Where burnable absorbers are deposited as a coating on the exterior of nuclear fuel pellets, boron containing compounds such as boron carbide ($B_4C$), boron nitride (BN) and zirconium diboride ($ZrB_2$) are most frequently used. Boron containing burnable absorbers may be applied as a coating of predetermined thickness to nuclear fuel pellets by a variety of techniques, for example, dip coating a nuclear fuel pellet in a composition containing a boron compound and a ceramic binder as disclosed in the above-mentioned United States Patent. However, the use of boron containing compounds as a burnable absorber is known to have a number of undesirable characteristics. For example, boron has a moderate burnout rate which often leaves residual burnable absorber within the coating at the end of any given time, thereby often adversely affecting the calculated control of the nuclear reactivity over the operating life cycle of the nuclear reactor. In addition, the burnout of boron from the coating often results in the retention within the fuel rods of undesirable gases produced by the boron burnout, thereby also adversely affecting the performance of the nuclear fuel rod and burnable absorber.

Accordingly, it can be appreciated that there is an unsolved need for a glazed nuclear fuel pellet and a glazing composition therefor which includes one or more burnable absorbers having a controlled increased rate of burnout without producing undesirable gases such that the nuclear reactivity of a reactor core can be effectively controlled and ultimately extending the operating life cycle of the nuclear reactor.

SUMMARY OF THE INVENTION

It is broadly an object of the present invention to provide a cadmium oxide (CdO) glazed nuclear fuel pellet and glazing composition therefor which overcomes or avoids one or more of the foregoing disadvantages resulting from the use of the above-mentioned prior art burnable absorbers, and which fulfills the specific requirement of such a glazed nuclear fuel pellet and glazing composition therefor for use generally with nuclear reactors having one or more fuel assemblies. Specifically, it is within the contemplation of one aspect of the present invention to provide a cadmium oxide glazed nuclear fuel pellet and glazing composition therefor which controls the reactivity and extends the operating life cycle of a fuel assembly while increasing the rate of burnout of the burnable absorber and reducing the amount of undesirable gases produced therefrom.

A further object of the present invention is to provide a glazed nuclear fuel pellet and glazing composition therefor having cadmium-113 isotope in the form of cadmium oxide as a burnable absorber which increases the rate of burnout of the burnable absorber and therefore results in less burnable absorber being present at the end of any given time.

A still further object of the present invention is to provide a glazing composition including cadmium oxide as a burnable absorber for glazing nuclear fuel pellets wherein the glazed coating is both hard and durable for use in a nuclear reactor.

A yet still further object of the present invention is the use of cadmium-113 isotope in the form of cadmium oxide in the substitution, wholly or in part, for boron-10 isotope containing compounds of the prior art burnable absorbers.

In accordance with one embodiment of the present invention, there is provided a glaze forming composition for glazing nuclear fuel pellets with a burnable absorber, the composition comprising at least about 0.5 percent by weight cadmium oxide (CdO) as a first burnable absorber and at least one glaze forming oxide.

In accordance with the above embodiment of the present invention, the glaze forming oxide is selected from the group consisting of silicon dioxide ($SiO_2$), aluminum oxide ($Al_2O_3$), boric oxide ($B_2O_3$), sodium monoxide ($Na_2O$), potassium oxide ($K_2O$), lead monoxide (PbO), and mixtures thereof.

Still further in accordance with the above embodiment, there is further included a second burnable absorber, the first and second burnable absorbers having different neutron capture cross sections, and wherein the second burnable absorber comprises boron in at least the form of boron-10 isotope, for example, sodium borate ($Na_2B_4O_7.10H_2O$).

In accordance with another embodiment of the present invention, there is provided a glazed nuclear fuel pellet comprising fissionable material formed into a body and a glaze provided over at least a portion of the surface of the body, the glaze comprising a mixture of at least 0.5 percent by weight cadmium oxide (CdO) as a first burnable absorber and at least one glaze forming oxide.

In accordance with the last-mentioned embodiment, the glaze forming oxide comprises a borosilicate glass.

BRIEF DESCRIPTION OF THE DRAWING

The above description, as well as further objects, features, and advantages of the present invention, will be more fully understood by reference to the following detailed description of a presently preferred, but nonetheless illustrative, cadmium oxide glazed nuclear fuel pellet and glazing composition therefor in accordance with the present invention, when taken in conjunction with the sole accompanying drawing, wherein such drawing discloses a nuclear fuel pellet of fissionable material having a glazed coating containing at least 0.5 percent by weight cadmium oxide as a burnable absorber.

DETAILED DESCRIPTION

Cadmium oxide has been found by the inventor to be similar in chemical behavior to the lead and zinc oxides, but generally forms higher melting compounds than lead oxide. For example, cadmium silicate melts at about 1240° C., whereas lead silicate melts at about 750° C. A cadmium oxide/boron oxide eutectic melts at about 900° C., whereas a lead oxide/boron oxide eutectic melts at about 500° C. In accordance with the present invention, glasses suitable for use as a glaze on nuclear fuel elements and containing a burnable absorber can be made using cadmium oxide instead of lead oxide, except that such glazes must be fired at higher temperatures than the lead-based glazes. In particular, it has been further found that there are a group of glasses known as borosilicate glasses which include boron trioxide as a suitable glass forming component. Since cadmium oxide, like lead oxide, forms a series of glasses with silicon dioxide, the present invention broadly contemplates the substitution of cadmium oxide, wholly or in part, for the boron trioxide in these borosilicate glasses.

Referring to the sole FIGURE, there is disclosed a nuclear fuel pellet 100 of fissionable material, that is, a material fissionable by neutrons of thermal energy such as U-235, U-233 and Pu-239. Coating the exterior of the nuclear fuel pellet 100 is a glaze 102 which includes a burnable absorber, which in accordance with the present invention, comprises an oxide of cadmium-113 isotope which has a neutron capture cross section of about 20,000 barns per atom. The cadmium-113 isotope is about five times more effective as a burnable absorber than the boron-10 isotope which has a neutron capture cross section of only about 3850 barns per atom. The glaze 102 containing cadmium-113 isotope is useful as a burnable absorber in effectively controlling the reactivity of a reactor core and ultimately extending the operating life cycle of the nuclear reactor. The camdium-113 isotope, as a constituent of the glaze 102 coating the nuclear fuel pellet 100, functions as a burnable absorber which burns out at a rate which reduces the negative reactivity introduced into the reactor by the cadmium-113 isotope at a rate approximately equal to the decline in excess reactivity due to fissionable material depletion. The glaze 102, in addition to containing the oxide of cadmium-113 isotope as a burnable absorber, contains any of the common constitutes of glass such as silicon dioxide ($SiO_2$), aluminum oxide ($Al_2O_3$), boric oxide ($B_2O_3$), sodium monoxide ($Na_2O$), potassium oxide ($K_2O$), lead monoxide (PbO), and mixtures thereof. However, in accordance with the present invention, it has been found that for the glaze 102 to be useful as a burnable absorber, the oxide of the cadmium-113 isotope should be present in greater than about 0.5 percent by weight. For example, the glaze 102 may contain cadmium oxide in the range of about 50 to 95 percent by weight; preferably in the range of about 70 to 95 percent by weight cadmium oxide; the preferred range being about 82 to 90 percent by weight cadmium oxide; and the balance being, for example, silicon dioxide.

The use of boron-10 isotope as a burnable absorber in a coating on a nuclear fuel pellet contemplates a concentration of the order of 3.2 milligrams of natural boron per centimeter of pellet length. The corresponding quantity of cadmium-113 isotope is 11.0 milligrams of natural cadmium per centimeter of pellet length. When cadmium-113 isotope is substituted for the boron-10 isotope, such substitution would, for example, be approximately in the ratio of 11 parts by weight of cadmium to 3.2 parts by weight of boron. This substitution of the oxide of cadmium-113 isotope for the boron-10 isotope, increases the rate of burnout of the burnable absorber, reduces the amount of undesirable gases produced by the burnout of the boron, and produces a harder and more refractory glaze coating. In this regard, the cadmium-113 isotope produces no gaseous products as a result of neutron capture. Thus, the use of the oxide of cadmium-113 isotope as a burnable absorber burns out more rapidly than the boron-10 isotope and leaves less residual burnable absorber at any given time than that of the boron-10 isotope.

Referring again to the sole FIGURE, a typical nuclear reactor pellet 100 of fissionable material, such as enriched uranium dioxide or mixed oxides, might be of the order of 0.5 inches (1.3 centimeters) in length. The nuclear fuel pellet 100 is expected to have a cadmium silicate glaze coating containing about 16 milligrams of the oxide of cadmium-113 isotope, i.e., about 87 percent cadmium by weight. However, greater or lesser amounts of cadmium oxide may be used in coating such nuclear fuel pellets as the present invention broadly relates to the use of cadmium oxide as a burnable absorber in a glaze for such nuclear fuel pellets, wherein cadmium-113 isotope is substituted, wholly or in part, for boron-10 isotope.

Further, although there has thus far been described the use of the oxide of cadmium-113 isotope as a burnable absorber in a glaze for nuclear fuel pellets, it is also contemplated that a combination of two burnable absorbers, each having different neutron capture cross sections, may be incorporated into the glaze for controlling the reactivity of the reactor core and ultimately extending the operating life cycle of the nuclear reactor. The incorporation of more than one burnable absorber having different neutron capture cross sections, provides an extra degree of freedom for the nuclear engineer in the design of a reactor core. The two burnable absorbers burn out at different rates so that the reactivity of the reactor core can be controlled with more finesse. The use of such a sophisticated control can result in savings of fissionable material and produce more energy per unit of fissionable material loaded into a reactor core. In accordance with the present invention, a cadmium borosilicate glaze may contain from about 50 to 75 percent by weight cadmium oxide, two (2) to three (3) percent by weight boric oxide, three (3) to six (6) percent by weight potassium oxide and the balance silicon dioxide. The boron-10 isotope can also be present as sodium borate ($Na_2B_4O_7 \cdot 10H_2O$).

The glaze 102 is applied to the nuclear fuel pellet 100 by a dip coating process. Generally, the constitutes of the glaze 102 are ground to a fine powder and made into a thin slurry with water. The pellets 100 to be glazed are dipped into the slurry which can be thickened or thinned to produce the ultimate coating of the proper thickness. The wet glaze containing cadmium oxide is dried to about 70° to 90° C. and subsequently fired to melt the glaze to hard refractory coating upon cooling. However, it should be noted that the nuclear fuel pellet 100 may be dipped into the slurry one or more times as required to produce the ultimate coating thickness, each dip being followed by a drying step. Thus, several dips can be applied to provide greater coating thicknesses as required.

The following example is illustrative of the present invention in applying a glaze 102 containing the oxide of cadmium-113 isotope as a burnable absorber of predetermined thickness to a nuclear fuel pellet 100 containing fissionable material.

EXAMPLE I

A cadmium silicate glaze composition for glazing nuclear fuel pellets in accordance with the present invention was prepared by grinding cadmium oxide powder and pure quartz powder in a porcelain ball mill with porcelain balls for 48 hours. The resulting mixed powders containing 89 percent by weight cadmium oxide, the balance silicon dioxide, was made into a slurry using water. Cylinders of uranium dioxide were dipped into the slurry and dried at about 70° to 90° C. and subsequently weighed. The dipping process was repeated until the cylinders had picked up the desired weight of dry slurry, that is, about 18 mg per 1.3 centimeters of cylinder length. The coated cylinders were fired at 1350° C. in an inert atmosphere furnace for three (3) hours to produce ceramic cylinders with a nearly uniform coating of cadmium silicate glaze of about five (5) microns thick. The glaze cylinders were heated and cooled in the furnace at a rate less than 15° C. per minute to prevent thermal shock to the cylinders. The furnace cycle was about two (2) hours for heat up, three (3) hours at glazing temperature, and twelve (12) hours for cool down.

Although the invention herein has been described with reference to particular embodiments, it is to be understood that these embodiments are merely illustrative of the principles and applications of the present invention. It is therefore to be understood that numerous modifications may be made in the illustrative embodiments and that other arangements may be devised without departing from the spirit and scope of the present invention as defined by the appended claims. In particular, although an exemplary application of the present invention would glaze nuclear fuel pellets (each having a generally cylindrical configuration with an approximately one-third inch diameter and an approximately one-half inch length) for placement in fuel rods which make up fuel assemblies, the glazing of nuclear fuel plates, columns or other nuclear fuel shapes is considered to be equivalent to the glazing of nuclear fuel pellets, which has been hereinbefore described.

I claim:

1. A glaze forming composition for glazing nuclear fuel pellets with a burnable absorber, said composition comprising cadmium oxide (CdO) present in the range of about 50 to 95 percent by weight as a first burnable absorber and at least one glaze forming oxide.

2. The composition of claim 1 wherein said cadmium oxide is present in the range of about 80 to 90 percent by weight.

3. The composition of claim 1 wherein said cadmium oxide is present at about 89 percent by weight.

4. The composition of claim 1 wherein cadmium is present in the form of cadmium-113 isotope.

5. The composition of claim 1 wherein said glaze forming oxide is selected from the group consisting of silicon dioxide ($SiO_2$), aluminum oxide ($Al_2O_3$), boric oxide ($B_2O_3$), sodium monoxide ($Na_2O$), potassium oxide ($K_2O$), lead monoxide (PbO), and mixtures thereof.

6. The composition of claim 1 wherein said glaze forming oxide comprises silicon dioxide.

7. The composition of claim 1 further including a second burnable absorber, said first and second burnable absorbers having different neutron capture cross sections.

8. The composition of claim 7 wherein said second burnable absorber comprises boron (B) in at least the form of boron-10 isotope.

9. The composition of claim 8 wherein said boron is present as sodium borate ($Na_2B_4O_7 \cdot 10H_2O$).

10. The composition of claim 8 wherein said boron is present as boric oxide ($B_2O_3$).

11. The composition of cliam 8 wherein the ratio by weight of boron to cadmium is about 3.2 to 11.

12. The composition of claim 1 wherein said glaze forming oxide comprises a borosilicate glass.

13. The composition of claim 8 wherein said cadmium oxide is present in the amount of about 50 to 75 percent by weight, said second burnable absorber comprises boric oxide ($B_2O_3$) present in the amount of about 2 to 3 percent by weight, and said glaze forming oxide comprises a mixture of potassium oxide ($K_2O$) and silicon dioxide ($SiO_2$), wherein said potassium oxide is present in the amount of about 3 to 6 percent by weight, the balance being silicon dioxide.

14. A glazed nuclear-fuel pellet comprising fissionable material formed into a body and a glaze provided over at least a portion of the surface of said body, said glaze comprising a mixture of at least 0.5 percent by weight cadmium oxide (CdO) as a first burnable absorber and at least one glaze forming oxide.

15. The pellet of claim 14 wherein said cadmium oxide is present in the range of about 50 to 95 percent by weight.

16. The pellet of claim 14 wherein said cadmium oxide is present in the range of about 80 to 90 percent by weight.

17. The pellet of claim 14 wherein said cadmium oxide is present at about 89 percent by weight.

18. The pellet of claim 14 wherein cadmium is present in the form of the cadmium-113 isotope.

19. The pellet of claim 14 wherein said glaze forming oxide is selected from the group consisting of silicon dioxide ($SiO_2$), aluminum oxide ($Al_2O_3$), boric oxide ($B_2O_3$), sodium monoxide ($Na_2O$), potassium oxide ($K_2O$), lead monoxide (PbO), and mixtures thereof.

20. The pellet of claim 14 wherein said glaze forming oxide comprises silicon dioxide.

21. The pellet of claim 14 further including a second burnable absorber, said first and second burnable absorbers having different neutron capture cross sections.

22. The pellet of claim 21 wherein said second burnable absorber comprises boron (B) in at least the form of boron-10 isotope.

23. The pellet of claim 22 wherein said boron is present in the form as sodium borate ($Na_2B_4O_7.10H_2O$).

24. The pellet of claim 22 wherein said boron is present as boric oxide ($B_2O_3$).

25. The pellet of claim 22 wherein the ratio by weight of said boron to cadmium is about 3.2 to 11.

26. The pellet of claim 22 wherein said cadmium oxide is present in the amount of about 50 to 75 percent by weight, said second burnable absorber comprises boric oxide ($B_2O_3$) present in the amount of about 2 to 3 percent by weight, and said glaze forming oxide comprises a mixture of potassium oxide ($K_2O$) and silicon dioxide ($SiO_2$) wherein said potassium oxide is present in the amount of about 3 to 6 percent by weight, the balance being silicon dioxide.

27. The pellet of claim 14 wherein said glaze forming oxide comprises a borosilicate glass.

* * * * *